United States Patent
He et al.

(10) Patent No.: US 9,202,260 B2
(45) Date of Patent: Dec. 1, 2015

(54) METHOD AND APPARATUS FOR PROCESSING SCANNED IMAGE

(71) Applicant: FUJITSU LIMITED, Kawasaki-shi, Kanagawa (JP)

(72) Inventors: Yuan He, Beijing (CN); Jun Sun, Beijing (CN); Satoshi Naoi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 302 days.

(21) Appl. No.: 13/862,935

(22) Filed: Apr. 15, 2013

(65) Prior Publication Data

US 2013/0272602 A1 Oct. 17, 2013

(30) Foreign Application Priority Data

Apr. 16, 2012 (CN) .......................... 2012 1 0111235

(51) Int. Cl.
*G06T 5/00* (2006.01)
(52) U.S. Cl.
CPC .................. *G06T 5/001* (2013.01); *G06T 5/005* (2013.01); *G06T 2207/10008* (2013.01); *G06T 2207/30176* (2013.01)
(58) Field of Classification Search
None
See application file for complete search history.

(56) References Cited

U.S. PATENT DOCUMENTS

| 5,377,019 | A | * | 12/1994 | Okisu et al. | 358/464 |
| 5,677,776 | A | * | 10/1997 | Matsuda et al. | 358/475 |
| 6,233,363 | B1 | * | 5/2001 | Iida | 382/274 |
| 6,256,411 | B1 | * | 7/2001 | Iida | 382/203 |
| 2006/0082849 | A1 | * | 4/2006 | Kaku | 358/537 |
| 2007/0245400 | A1 | * | 10/2007 | Paek et al. | 725/142 |
| 2010/0082365 | A1 | * | 4/2010 | Noordvyk et al. | 705/2 |

FOREIGN PATENT DOCUMENTS

CN 101777178 7/2010

OTHER PUBLICATIONS

Kumar, S.—"Algorithm for shadow detection in real colour images"—IJCSE 2010, pp. 2444-2446.*
Chinese Office Action dated Aug. 20, 2015 in corresponding Chinese Patent Application No. 201210111235.9.
Zhou, "The Research of New Image Inpainting Algorithm", China Academic Journal Electronic Publishing House, Jun. 24, 2008, 9 pp.

* cited by examiner

*Primary Examiner* — Bernard Krasnic
(74) *Attorney, Agent, or Firm* — Staas & Halsey LLP (57) ABSTRACT

The present invention relates to a method and apparatus for processing a scanned image. The method for processing a scanned image comprises: a shaded region extracting step of extracting a region, which is shaded by a shading object and lies in a margin in the vicinity of an edge of the scanned image, as a shaded region and a pixel value repairing step of repairing values of pixels, which lie both in a line segment and the shaded region, by using a linear model according to known values of pixels, which lie both in the line segment and the margin, the line segment passing through the shaded region and being parallel to the edge.

8 Claims, 9 Drawing Sheets

Fig. 5 (amended)

Fig. 6 (amended)

METHOD AND APPARATUS FOR PROCESSING SCANNED IMAGE

CROSS REFERENCE TO RELATED APPLICATIONS

The application is based on the Chinese Patent Application No. 201210111235.9 filed on Apr. 16, 2012 and entitled "Method and Apparatus for Processing Scanned Image". The contents of which are incorporated herein by reference.

FIELD OF THE INVENTION

The present invention relates to a field of image processing, and particularly to a method and apparatus for processing a scanned image.

BACKGROUND OF THE INVENTION

Figure 5:
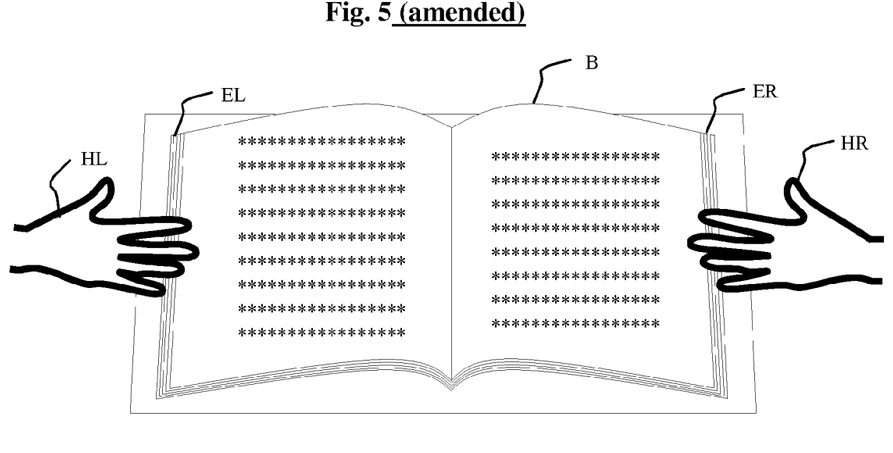
FIG. 5 is a schematic view illustrating a case in which a book is pressed by hands during scanning of the book.
Figure 6:
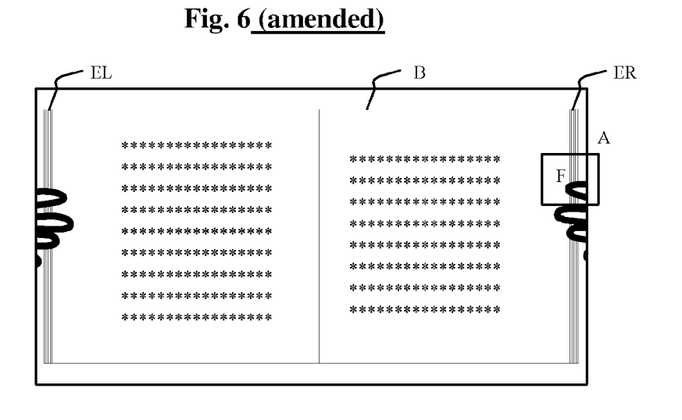
FIG. 6 is a schematic view illustrating the resultant image of the book as scanned in FIG. 5.

An optical imaging system can convert a paper document into a digital image. However, when a book is imaged by a non-contact imaging apparatus, for example, a overhead scanner or digital camera and etc., the pages of the book are often pressed by fingers so as to be fixed. In this case, there are fingers on both sides of the image as obtained, and the readability, integrity, and aesthetic property are reduced. FIG. 5 is a schematic view in which the pages of a book are pressed by fingers, and FIG. 6 is an image of a page as obtained by imaging, wherein it is apparent that the readability, integrity, and aesthetic property of the image are influenced by fingers on both sides of the book. Therefore, if the finger region can be removed by processing the image and filled by content of the page of the book, the quality of the image will be improved. Image inpainting is a technique for repairing image, which can remove a specified region in an image while making the change undiscoverable and was initially used for recovering the damaged oil painting.

Researchers proposed many methods for inpainting image, including structure based propagation, texture synthesis and example synthesis and so on. Some of these methods can be directly applied to remove finger region, and achieve good effects. However, the operation is time consuming and thus impractical.

Therefore, there is need for a method for inpainting image which can remove finger from the image of document while guarantee the change undiscoverable.

SUMMARY OF THE INVENTION

A simplified summary of the present invention is given below to provide a basic understanding of some aspects of the present invention. It should be appreciated that the summary, which is not an exhaustive overview of the present invention. The summary is not intended to identify the key or critical parts of the present invention or limit the scope of the present invention, but merely to present some concepts in a simplified form as a prelude to the more detailed description that is discussed later.

An object of the present invention is to provide a method and apparatus for processing a scanned image.

According to one aspect of the present invention, there is provided a method for processing a scanned image, comprising: a shaded region extracting step of extracting a region, which is shaded by a shading object and lies in a margin in the vicinity of an edge of the scanned image, as a shaded region; and a pixel value repairing step of repairing values of pixels, which lie both in a line segment and the shaded region, by using a linear model according to known values of pixels, which lie both in the line segment and the margin, the line segment passing through the shaded region and being parallel to the edge.

According to another aspect of the present invention, there is provided an apparatus for processing a scanned image, comprising: a shaded region extracting module configured to extract a region, which is shaded by a shading object and lies in a margin in the vicinity of an edge of the scanned image, as a shaded region; and a pixel value repairing module configured to repair values of pixels, which lie both in a line segment and the shaded region, by using a linear model according to values of pixels, which lie both in the line segment and the margin, the line segment passing through the shaded region and being parallel to the edge.

Further, according to an embodiment of the present invention, there is provided a computer program for realizing the aforementioned method.

Additionally, according to another embodiment of the present invention, there is provided a computer program product in the form of at least computer-readable medium, on which computer program codes are recorded to realize the aforementioned method.

These and other advantages of the present invention will be more apparent from the following detailed description of the best embodiments of the present invention made in conjunction with accompanying drawings.

BRIEF DESCRIPTION OF THE DRAWINGS

The above-mentioned and other objects, characteristics and advantages of the present invention will be more readily understood by reference to the description of embodiments of the present invention made in conjunction with accompanying drawings, in which elements are merely illustrative of the principle of the present invention, and identical or similar reference signs designate identical or similar technical features or elements.

DETAILED DESCRIPTION OF THE EMBODIMENTS

Preferred embodiments of the present invention are described below with reference to accompanying drawings. The elements and features described in one of the accompanying drawings or embodiments of the present invention may be combined with those shown in one or more other accompanying drawings or embodiments. It should be noted that for the sake of clarity, the presentation and description on the elements and processing that are irrelative with the present invention but well known by those skilled in the art are omitted.

A method 100 for processing a scanned image according to an embodiment of the present invention is described below with reference to FIG. 1.

Figure 1:
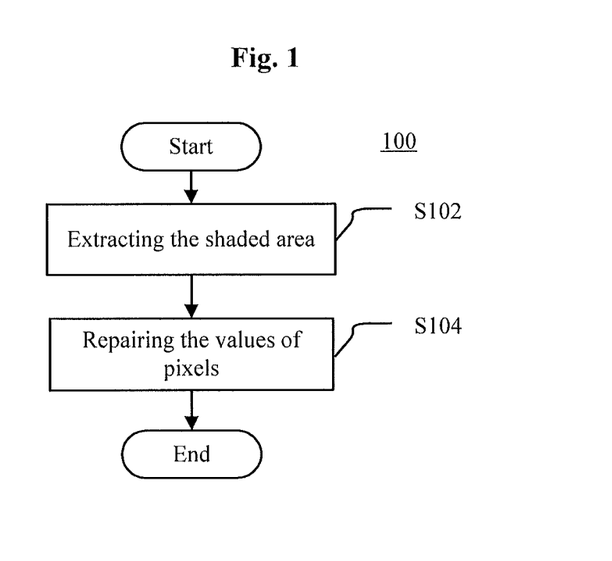
FIG. 1 is a flow chart illustrating a method for processing scanned image according to an embodiment of the present invention.

As shown in FIG. 1, in step S102, a region, which is shaded by a shading object and lies in a margin in the vicinity of an edge of the scanned image, is extracted as a shaded region. In general, there are no complicated patterns in the vicinity of the edges of many scanned image. For example, there are margins in the vicinity of the edges of books or other printings. The printings may be shaded by an object for pressing the edges of the printing during scanning. The object may be referred to as a shading object. In other words, in step S102, the region shaded by the shading object may be extracted.

In step S104, values of pixels, which lie both in a line segment and the shaded region, are repaired by using a linear model according to known values of pixels, which lie both in the line segment and the margin, wherein the line segment passes through the shaded region and is parallel to the edge. In other words, the extracted line segment passes through the shaded region and is parallel to the edge of the scanned image. Some pixels of the line segment are the known margin pixels, and the other pixels of the line segments are the pixels shaded by the shading object. The values of pixels, which lie both in the line segment and the region shaded by the shading object (i.e., the shaded region) are repaired based on a linear model according to known values of pixels, which lie both in the line segment and the margin.

Since the extracted line segment is parallel to an edge of the scanned image, in case that the scanned image of the book or other multi-pages printings is repaired, the shading region in the vicinity of the edges of the pages of the book may be repaired effectively.

In addition, the computing speed is increased and computing resource is saved by using the linear model.

Figure 2:
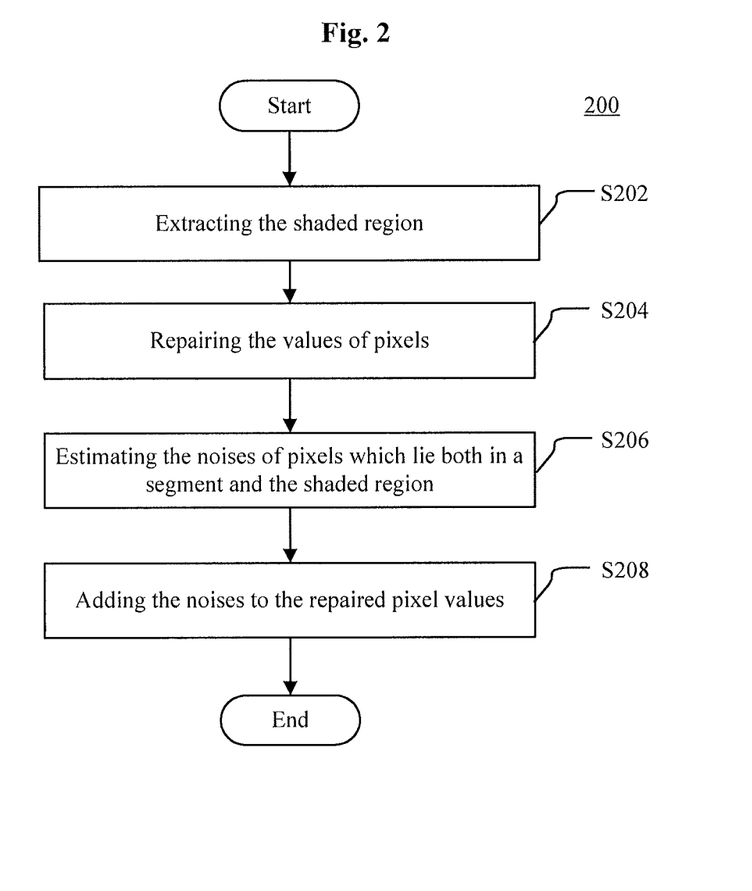
FIG. 2 is a flow chart illustrating a method for processing scanned image according to another embodiment of the present invention.

A method 200 for processing a scanned image according to another embodiment of the present invention is described below with reference to FIG. 2. Steps S202 and S204 of the method 200 are the same as the steps S102 and S104 which are described with reference to FIG. 1.

In step S202, a region which is shaded by a shading object and lies in a margin in the vicinity of an edge of the scanned image is extracted as a shaded region.

In step S204, values of pixels, which lie both in a line segment and the shaded region, are repaired by using a linear model according to known values of pixels, which lie both in the line segment and the margin, wherein the line segment passes through the shaded region and is parallel to the edge.

In step S206, noises of pixels, which lie both in a line segment and the shaded region, are estimated according to known noises of pixels, which lie both in the line segment and the margin, the line segment passing through the shaded region and being parallel to the edge.

In step S208, the estimated noises may be added to the values of the pixels, which lie both in the line segment and the shaded region.

In general, there are noises on the scanned image, even for the margin. The repaired region is hard to be discovered by estimating the noises of the shaded region according to the known noises of the pixels of the margin, and adding the noises to the values of the pixels of the shaded region.

The process 300 of extracting a shaded region in the step S102 (or the step S202) is described below with reference to FIG. 3.

Figure 3:
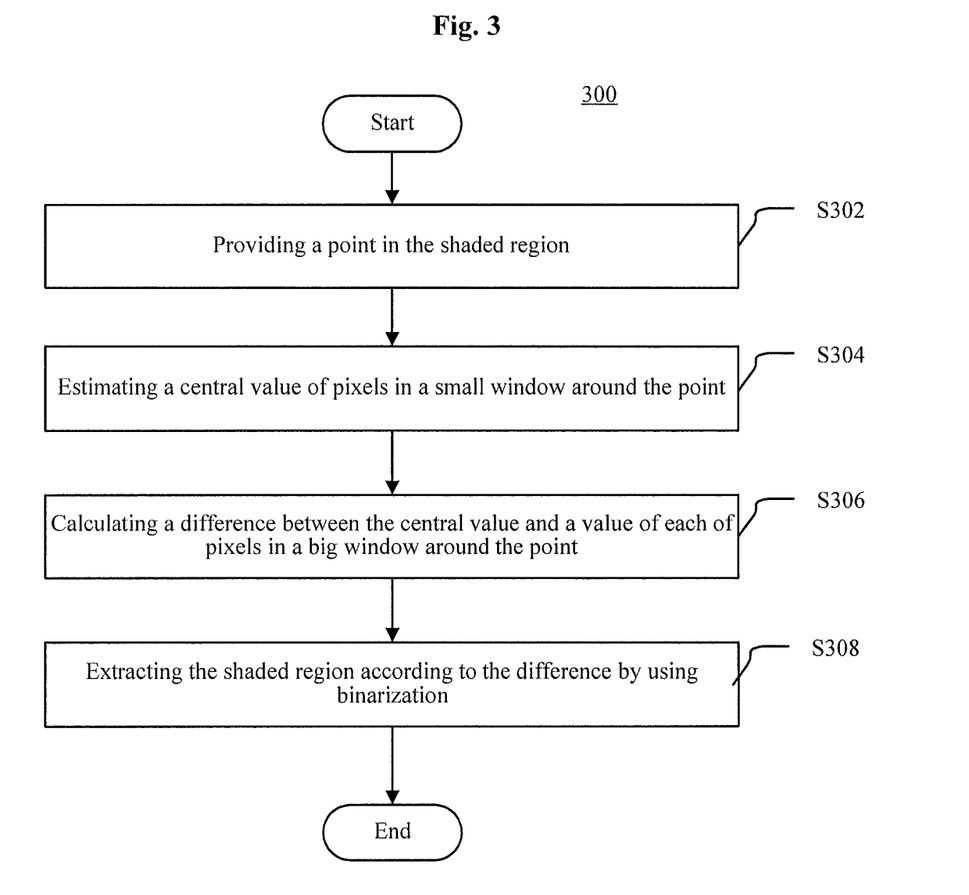
FIG. 3 is a flow chart illustrating a process of extracting a shaded region.

As shown in FIG. 3, in step S302, a point in the shaded region may be provided. For example, a point, which is given by a user, in the shaded region may be used.

In step S304, a central value of pixels in a small window around the point may be estimated. For example, the algorithm of mean shift clustering may be performed on the neighborhood of the point. Alternatively, statistic histogram (e.g., color histogram) of pixel values may be used to obtain the pixel value (e.g., value of color) with the highest frequency of occurrence.

In step S306, a difference between the central value and a value of each of pixels in a big window around the point may be calculated. In case that the pixel values are color values, the difference may be expressed by euclidean distance in the color space. The bigger the distance is, the smaller the similarity between the shaded region and the finger region is, and vise visa.

In step S308, the shaded region may be extracted according to the difference by using binarization. That is, classification may be performed according to the distances based on binarization, and possible shaded region and margin region are obtained as the result of the classification. Finally, the possible shaded region, in which the point is located, is extracted as the shaded region.

The shaded region may be extracted effectively and simply by the process 300.

Figure 4:
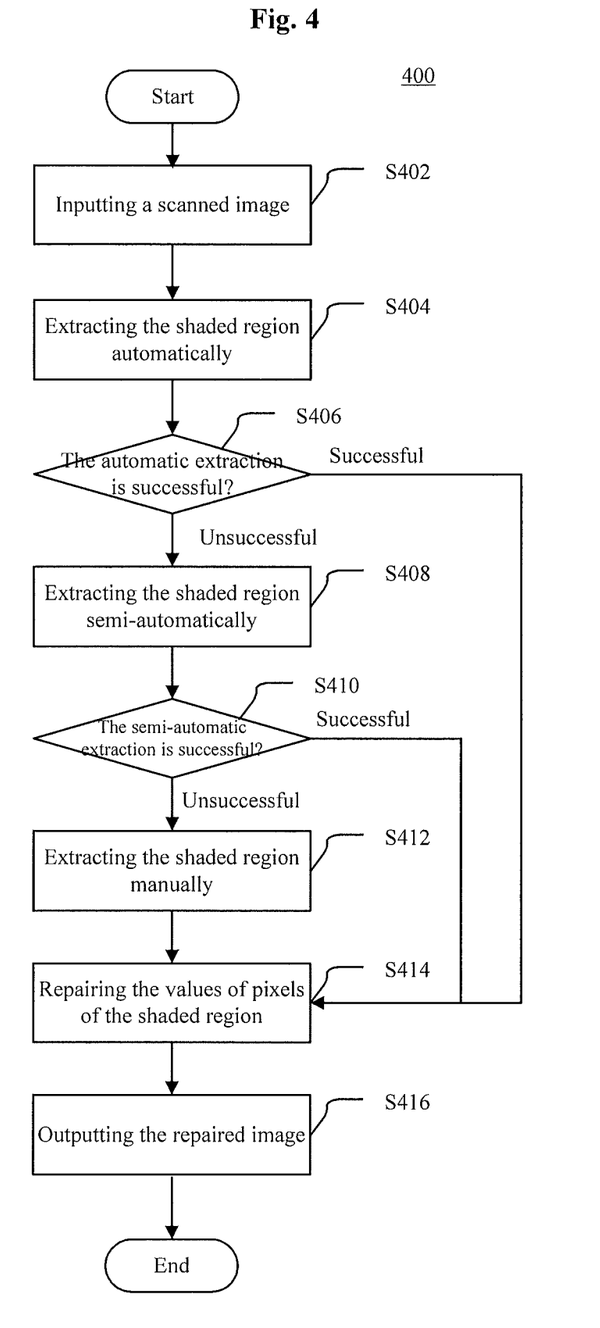
FIG. 4 is a flow chart illustrating a method for processing scanned image according to yet another embodiment of the present invention.

The shaded region may be extracted in automatic or manual manner, instead of the process 300. Alternatively, the shaded region may be extracted by using the combination of the automatic manner, manual manner and the process 300. In method 400 as shown in FIG. 4, the shaded region is extracted by using combination of the automatic manner, manual manner and the process 300.

The method 400 for processing a scanned image according to yet another embodiment of the present invention are described below with reference to FIG. 4. The main difference between the method 400 and the method 100, which is described with reference to FIG. 1, is that the automatic extraction step (S404) and manual extraction step (S412) as well as determination steps (S408 and S410) and are involved.

Firstly, in step S402, a scanned image is input. There are regions shaded by the shading objects in the vicinity of the edges of the scanned image.

In step S404, automatic extraction of the shaded regions in the vicinity of the edges of the input scanned image is attempted. The step may be performed by using many existing methods. For example, some features of the image, such as color, shape and etc. of the shaded object (e.g., finger or other objects), may be used.

In step S406, it is determined that whether the automatic extraction in step S404 is successful. If the automatic extraction in the step S404 is successful, the flow proceeds to step S414. If the automatic extraction in step S404 is unsuccessful, the flow proceeds to step S408.

In the step S408, semi-automatic extraction of the shaded region may be attempted. For example, the semi-automatic extraction for the finger region may be performed under the intervention of a user. In one of simple possible solutions, the user clicks in the finger region by using the mouse, to achieve the intervention. Then, a computer automatically extracts the finger region according to the position clicked by the user. That is, similar to the process 300, a point in the shaded region is provided, a central value of pixels in a small window around the point is estimated, and a difference between the central value and a value of each of pixels in a big window around the point is calculated, and finally the shaded region is extracted according to the calculated difference by using binarization.

Next, in step S410, it is determined that whether the semi-automatic extraction in step S408 is successful. If the semi-automatic extraction in step S408 is successful, the flow proceeds to step S414. Or else, the flow proceeds to step S412. In step S412, the shaded region is extracted manually.

In step S414, the values of pixels of the shaded region are repaired. For example, similar to step S104 in FIG. 1, the values of pixels, which lie both in a line segment and the shaded region, may be repaired by using a linear model according to known values of pixels, which lie both in the line segment and the margin, wherein the line segment passes through the shaded region and is parallel to the edge.

Finally, in step S416, the repaired scanned image is output.

The shaded region is extracted by combining the automatic extraction, the process 300 and the manual extraction, such that the shaded region is extracted more accurately and effectively.

The case, in which a book is pressed by hands, is described below with reference to FIGS. 5 and 6. Herein, book B is assumed to be positioned horizontally, and the fingers, which may press the book B, appear on the right and left sides of the image.

As shown in FIG. 5, in case of scanning the book B, for making the book flat and convenient to be scanned, the margins of the book are pressed by hands HL and HR or other objects (i.e., the shading object), and thus the book is shaded. However, in the case, there are fingers F on the margin of the scanned image, as shown in FIG. 6, which influences the readability, integrity and aesthetic property of the scanned page.

Figure 7:
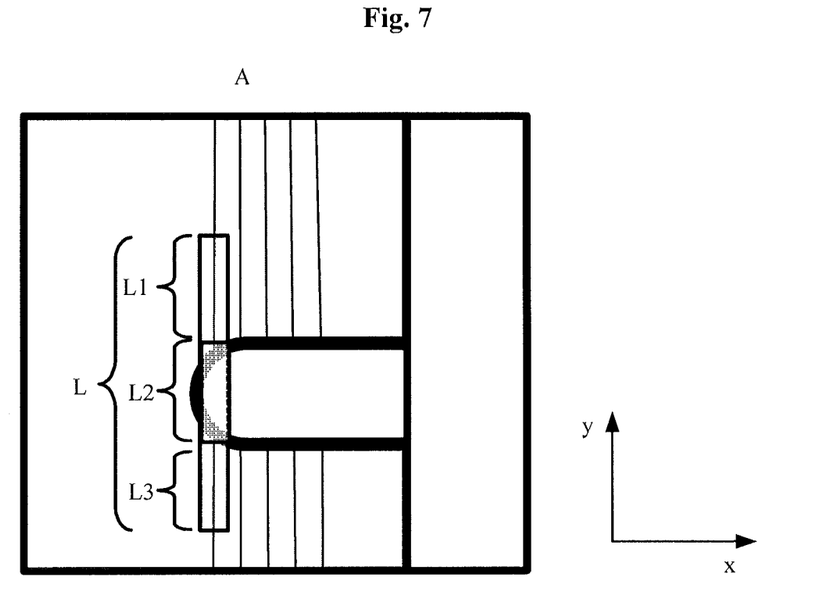
FIG. 7 is an enlarged view illustrating the part A in FIG. 6.
Figure 8:
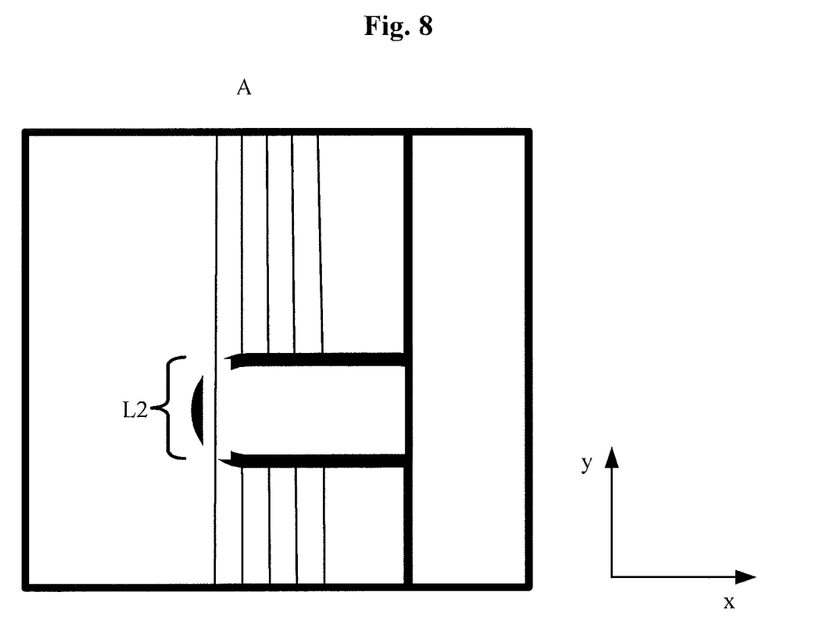
FIG. 8 is a schematic view illustrating the result image of line segment L being repaired in the part A in FIG. 7.

The process of repairing the part A of FIG. 6 is described below with reference to FIGS. 7 and 8. The following description is made mainly on the process of repairing the color values. However, it can be understood that other values, for example, luminance, grayscale, tone and etc., of the pixels, may be repaired by similar process.

Through observation, it is noted that there is background having pure color on the right and left sides of the pages of the book, and when an user pressing the book, the user often presses the region having pure color to avoid shading the contents such as characters. Therefore, the region of the book, which is shaded by the fingers, may be estimated by using a linear color model. In addition, since a plurality of overlapping pages have edges ER and EL, as shown in FIGS. 6 and 7. The edges ER and EL are substantially parallel to the edges of the scanned image. Based on the observation, the repairing may be performed in unit of the line segment, which is parallel to the edges of the scanned image, such that the edges ER and EL may be repaired better and more rapidly.

Taking the linear color model in the vertical direction as an example, for each of the vertical columns of pixels in the finger region, a color model is estimated. As shown in FIG. 7, for the column L2 of pixels to be removed, the columns L1 and L3 of pixels extending upward and downward are known and belonging to the margin of the book. The vertical position and color value of each pixel are known. Based on the vertical positions and color values of the pixels, the vertical linear color model, in which the color value is a function of the vertical position, may be estimated. Then, the color value of each of the pixels in the column L2 to be removed is estimated according to the model. The result is shown in FIG. 8. As shown in FIGS. 7 and 8, the columns L1, L2, and L3 of pixels are depicted to have certain widths. It should be understood that such depicted columns are only for the reader to feel clearer. Actually, actual widths of columns of pixels will be narrower.

In the estimation method of the linear mode, it is assumed that the coordinates of the target column L2 of pixels are $\{(x_i, y_{i0}), (x_i, y_{i0+1}), \ldots, (x_i, y_{i1})\}$, wherein $y_{i0}$ and $y_{i1}$ are minimum and maximum coordinates in y-axis respectively. The neighboring upper column of pixels L1 $\{(x_i, y_{i1+1}), (x_i, y_{i1+2}), \ldots, (x_i, y_{i1+M})\}$ and the neighboring lower column of pixels L3 $\{(x_i, y_{i0-N}), (x_i, y_{i0-N+1}), \ldots, (x_i, y_{i0-1})\}$ are considered, wherein M and N are the number of the pixels of the neighboring column L1 and the number of the pixels of the neighboring column L3. In practical application, M and N may be set according to experience or tests. It is assumed that the input image of a document is a color image, and each of the pixels (x, y) has a color value $I_k(x, y)$, wherein k=R, G, B. For each of the color channels R, G and B, a linear model may be estimated. That is, $\{I_k(x_i, y_n), n=i0-N, i0-N+1, \ldots, i0-1, i1+1, i1+2, \ldots, i1+M\}$ is input. The linear model as estimated is $\tilde{I}_k(x_i, y) = a_{ki}y + b_{ki}$, wherein in the linear model, $a_{ki}$ and $b_{ki}$ are parameters corresponding to the $i^{th}$ column and color channel k respectively.

For some documents which haven good printing quality and are well scanned, the linear model, in which $\{I_k(x_i, y), y=y_{i0}, y_{i0+1}, \ldots, y_{i1}\}$ in the original image is replaced with $\{\tilde{I}_k(x_i, y), y=y_{i0}, y_{i0+1}, \ldots, y_{i1}\}$, is enough. However, typically there are noises in the uniform region in the image. If the phenomenon of noise may be simulated when a specified region is repaired, the result of repairing may be more natural, such that the region after being repaired is hard to be discovered. The noises are added manually by estimating parameters for the noises and performing simulation according to the parameters of the noises. For example, it is assumed that the noises comply with Gauss distribution, $I_k(x_i, y) = \tilde{I}_k(x_i, y) + \theta(x_i, y)$, wherein $\theta(x, y)$ is a model of the noises. The parameters of the Gauss model may be estimated according to the upper and lower neighboring columns $\{y_n, n=i0-N, i0-N+1, \ldots, i0-1, i1+1, i1+2, \ldots, i1+M\}$.

$$\{\theta(x_i, y_n) = I_k(x_i, y_n) - \tilde{I}_k(x_i, y_n), n = i_0-N, i_0-N+1, \ldots, i_0-1, i_1+1, i_1+2, \ldots, i_1+M\}$$

The mean value $$\mu_i = \frac{\sum_{y_n} \theta(x_i, y_n)}{N + M},$$

and the variance $$\sigma_i = \sqrt{\frac{\sum_{y_n} (\theta(x_i, y_n) - \mu_i)^2}{N + M - 1}}$$

After the Gauss model parameters (i.e., the mean value and variance) of noises of are obtained, the Gauss model is added to the filling result. And for each pixel, a random noise $\hat{\theta}(x_i, y_j) = \mu_i + \sigma_i \lambda_j$ is added, wherein $\lambda_j$ is a random parameter, the range of $\lambda_j$ is determined according to experience, such as [−3, 3] or [4, 1].

Although the above description is made with respect to the Gauss model, it should be appreciated that other suitable model may be used to add noises.

A block diagram illustrating an apparatus for processing a scanned image according to an embodiment of the present invention is described below with reference to FIG. 9.

Figure 9:
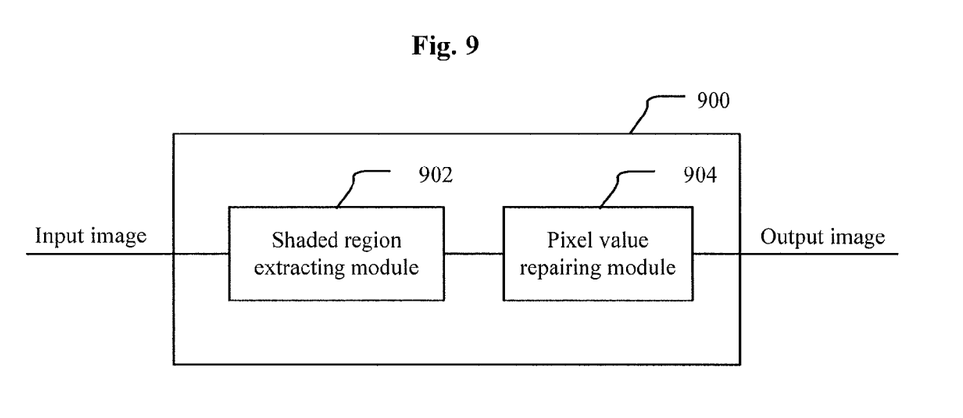
FIG. 9 is a block diagram illustrating an apparatus for processing a scanned image according to an embodiment of the present invention.

As shown in FIG. 9, the apparatus for processing a scanned image 900 includes a shaded region extracting module 902 and a pixel value repairing module 904.

The shaded region extracting module 902 receives an input scanned image, and extracts a region, which is shaded by a shading object and lies in a margin in the vicinity of an edge of the scanned image, as shaded region. Then, the shaded region extracting module 902 may send the extracted shaded region to the pixel value repairing module 904.

The pixel value repairing module 904 receives the resultant shaded region which is sent from the shaded region extracting module 902, and repairs the values of pixels which lie both in a line segment and the shaded region, by using a linear model according to known values of pixels, which lie both in the line segment and the margin, wherein the line segment passing through the shaded region and is parallel to the edge.

The detailed processes of extracting the shaded region and repairing the pixel values are similar to the method which is described with reference to FIG. 1, and will not be described again here.

Figure 10:
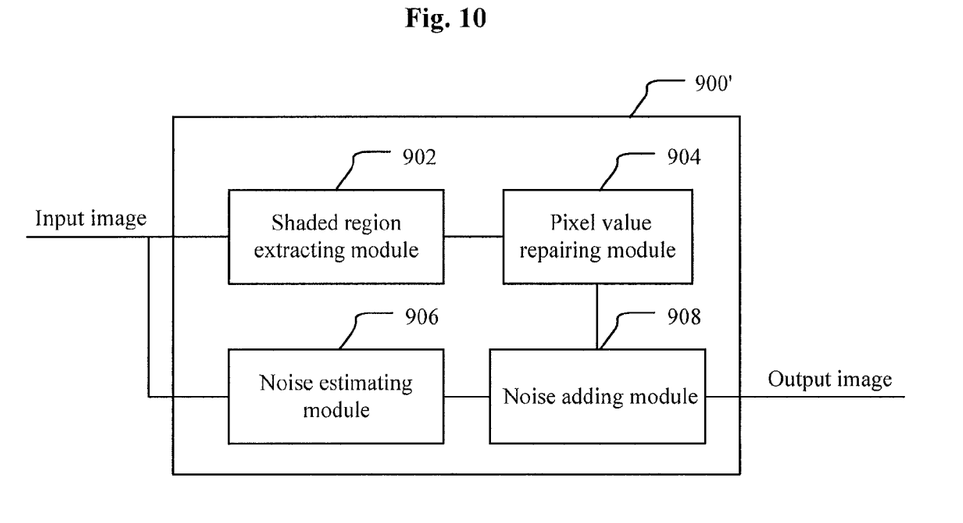
FIG. 10 is a block diagram illustrating an apparatus for processing a scanned image according to another embodiment of the present invention.

An apparatus 900' for processing a scanned image according to another embodiment of the present invention is described below with reference to FIG. 10. The difference between the apparatus 900' in FIG. 10 and the apparatus 900 in FIG. 9 is that the apparatus 900' may further include a noise estimating module 906 and a noise adding module 908.

The noise estimating module 906 receives the input scanned image, and estimates noises of pixels, which lie both in a line segment and the shaded region, according to known values of pixels, which lie both in the line segment and the margin, wherein the line segment passes through the shaded region and is parallel to the edge. The noise adding module 908 adds the estimated noises to the values of the pixels which lie both in the line segment and the shaded region, that is, the pixel values which have been repaired by the pixel value repairing module 904. Then, the noise adding module 908 may output the resultant image as the repaired image.

The shaded region extracting module 902 according to an example of the present invention is described below with reference to FIG. 11.

Figure 11:
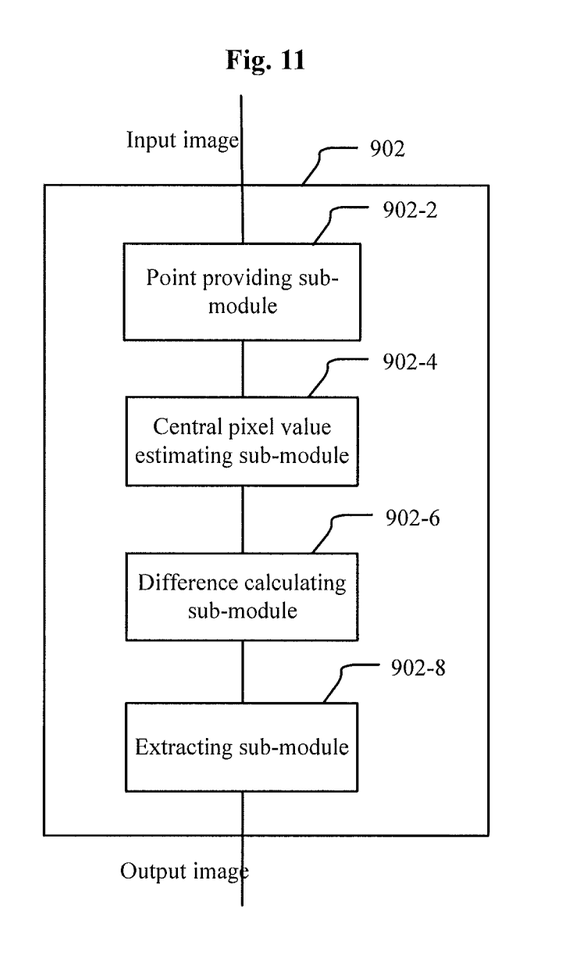
FIG. 11 is block diagram illustrating configuration of the shaded region extracting module.

As shown in FIG. 11, the shaded region extracting module 902 may includes a point providing sub-module 902-2, a central pixel value estimating sub-module 902-4, a difference calculating sub-module 902-6 and an extracting sub-module 902-8.

The point providing sub-module 902-2 receives the input scanned image and provides a point in the shaded region. Then, the point providing sub-module 902-2 may provide the point to the central pixel value estimating sub-module 902-4.

Then, the central pixel value estimating sub-module 902-4 may estimate a central value of pixels in a small window around the point.

The difference calculating sub-module 902-6 may calculate a difference between the central value and a value of each of pixels in a big window around the point.

The extracting sub-module 902-8 may extract the shaded region according to the difference by using binarization.

Figure 12:
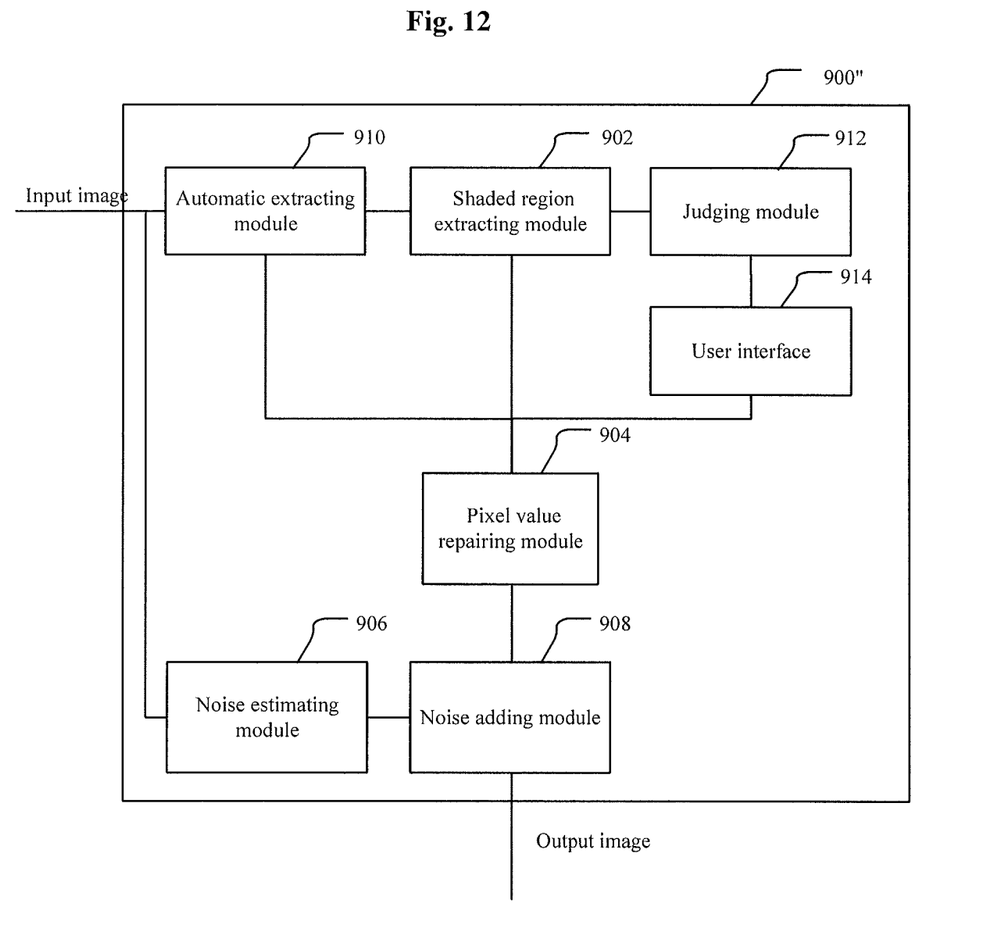
FIG. 12 is a block diagram illustrating an apparatus for processing a scanned image according to another embodiment of the present invention.

The apparatus 900'' for processing a scanned image according to another embodiment of the present invention is described below with reference to FIG. 12. The difference between the apparatus 900'' in FIG. 12 and the apparatus 900' in FIG. 10 is that the apparatus 900'' further includes an automatic extracting module 910, a judging module 912 and a user interface 914.

The automatic extracting module 910 may extract the shaded region automatically. If the automatic extracting module 910 extracts the shaded region successfully, the shaded region extracting module 902 does not perform the shaded region extraction, if the automatic extracting module 910 extracts the shaded region unsuccessfully, the shaded region extracting module 902 performs the shaded region extraction. The judging module 912 may judge whether the shaded region extracting module extracts the shaded region successfully. The user interface 914 may enable manual extraction of the shaded region if the automatic extracting module extracts the shaded region unsuccessfully.

For example, the shading object may be a finger. The pixel values may include color values. The scanned image has a plurality of edges which are overlapped and parallel to each other.

The basis principles of the present invention are described in conjunction with the specific embodiments. However, it should be pointed out those skilled in the art will understand any steps or components or all of the methods and apparatus according to the present invention may be implemented in any computing apparatus (including processors, storing medium and etc.) or a network of computing apparatus in form of hardware, firmware, software and the combination thereof, and this can be achieved by those skilled in the art by using their basic programming skills after reading the description of the present invention.

Therefore, the objects of the present invention may also be achieved by running a program or a group of programs on any information processing apparatus. The information processing apparatus may be a common general purpose apparatus. Therefore, the object of the present invention may also achieved by providing a program product embodying program code for implementing said method or apparatus. That is, such program product will constitute the present invention, and medium for transporting or storing such program product may also construct the present invention. Obviously, said storage or transport medium may be any type of storage or transport medium known by those skilled in the art, or developed in the future, and thus it is unnecessary to exemplify various storage or transport medium herein.

Figure 13:
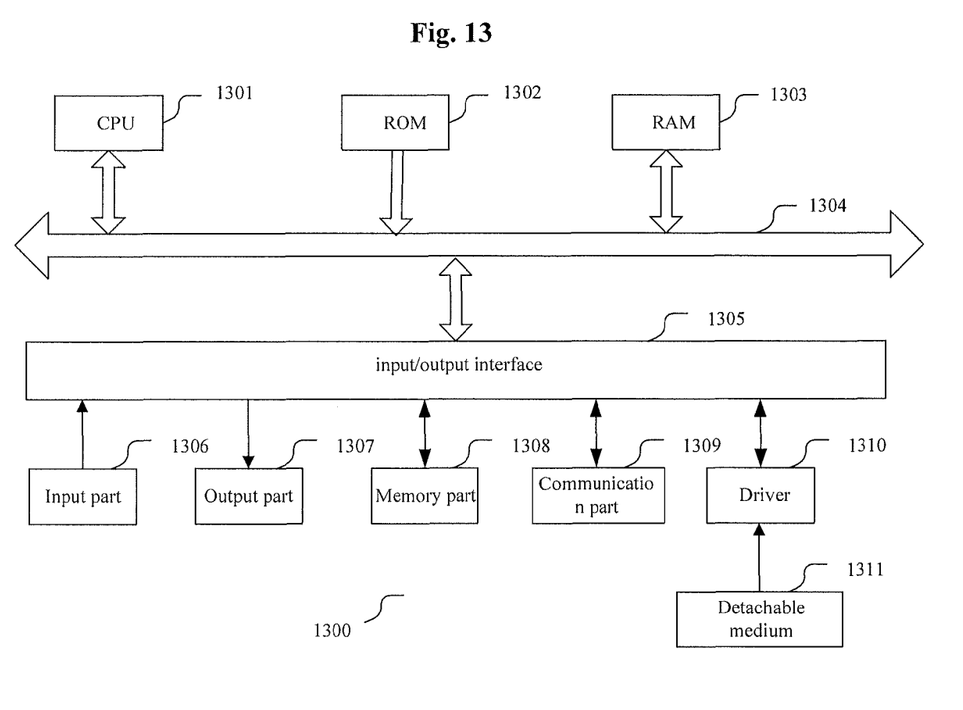
FIG. 13 is a schematic diagram illustrating the structure of an exemplified computing apparatus for realizing the method and apparatus for processing a scanned image disclosed herein.

In case that the embodiments of the present invention are implemented by using software and/or firmware, a program constructing the software is loaded from the storing media or internet to the computer with dedicated hardware structure, for example, the general purpose computer 1300 as shown in FIG. 13, and when the computer is loaded with various programs, the computer can perform various functions and etc.

In FIG. 13, an operation processing unit (CPU) 1301 executes various processing via a program stored in a read-only memory (ROM) 1302 or a program loaded to a random access memory (RAM) 1308 from a memory part 1303. The data needed for the various processing of the CPU 1301 may be stored in the RAM 1303 as needed. CPU 1301, ROM 1302 and RAM 1303 are linked with each other via a bus line 1304, with which an input/output 1305 is also connected.

The following members are linked with the input/output interface 1305: an input part 1306 (including keyboard, mouse and the like), an output part 1307 (including displays such as cathode ray tube (CRT), liquid crystal display (LCD) and loudspeaker), a memory part 1308 (including hard disc and the like), and a communication part 1309 (including a network interface card such as LAN card and modem). The communication part 1309 realizes a communication via a network such as the Internet. A driver 1310 may also be linked with the input/output interface 1305, if needed. If needed, a detachable medium 1311, for example, a magnetic disc, an optical disc, a magnetic optical disc, a semiconductor memory and the like, may be installed in the driver 1310 to read a computer program there from and install the read computer program in the memory part 1308.

In the case where the foregoing series of processing is achieved through software, programs forming the software are installed from a network such as the Internet or a memory medium such as the detachable medium 1311.

It should be appreciated by those skilled in the art that the memory medium is not limited to the detachable medium 1311 shown in FIG. 13, which is distributed separated from the apparatus so as to provide the programs for users. The detachable medium 1311 may be, for example, a magnetic disc (including Floppy Disc®), a compact disc (including compact disc read-only memory (CD-ROM) and digital versatile disc (DVD), a magneto optical disc (including Mini Disc (MD)®)), and a semiconductor memory. Alternatively, the memory mediums may be the hard discs included in ROM 1302 and the memory part 1308, and programs are stored in the memory medium and can be distributed to users along with the memory medium.

The present invention further discloses a program product in which machine-readable instruction codes are stored. The aforementioned image processing method according to embodiments of the present invention can be implemented when the instruction codes are read and executed by a machine.

Accordingly, a memory medium for embodying the program product in which computer-readable instruction codes are stored is also included in the present disclosure. The memory medium includes but is not limited to soft disc, optical disc, magnetic optical disc, memory card, memory stick and the like.

Those skilled in the art will understand that the exemplified embodiments herein are only examples and the present invention do not limited thereto.

In the description, the expressions such as "first", "second", "Nth" and etc. are used for distinguishing the described features literally, so as to describe the present invention more clearly. Therefore, the expressions should not be construed as any limited meanings.

As an example, various steps of the above methods and various components and/or units of the above apparatus may be implemented as software, firmware, hardware or a combination thereof, and as a part of the corresponding apparatus. The specific means or manner, in which the various modules, units of the above apparatus are configured by the software, firmware, hardware or a combination thereof, is known by those skilled in the art, and will not be described again.

As an example, in case the embodiments of the present invention are implemented by using software or firmware, a program constructing the software is loaded from the storing media or internet to the computer with dedicated hardware structure, for example, the general purpose computer 1300 as shown in FIG. 13, and when the computer is loaded with various programs, the computer can perform various functions and etc.

In the foregoing description on the specific embodiments of the present invention, the features described and/or shown for an embodiment may be used in one or more other embodiments in the same or similar way or merged with the those of the other embodiments, or replace those of the other embodiments.

It shall be emphasized that the technical term "comprise/include" is used herein to refer to an existence of a feature, an element, a step or a component, without excluding existences or attachments of one or more other features, elements, steps or components.

In addition, the method according to the present invention is not necessarily performed in the order as described in the specification, and may be performed sequentially, in parallel or independently. Therefore, the order of the methods of the present invention do not constitute limitation to the technical scope of the present invention.

Although the present utility model and its advantages have been described in detail, it should be understood that various changes, substitutions and alterations can be made herein without departing from the spirit and scope of the utility model as defined by the appended claims. Moreover, the scope of the present application is not intended to be limited to the particular embodiments of the process, apparatus, means, methods and steps described in the Description. As one of ordinarily skill in the art will readily appreciate from the disclosure contained in the utility model, processes, apparatus, means, methods or steps presently existing or later to be developed, that perform substantially the same function or achieve substantially the same result as the corresponding embodiments described herein may be utilized according to the present utility model. Accordingly, the appended claims are intended to include within their scope such processes, apparatus, means, methods, or steps.

It shall be emphasized that the technical term "comprise/include" is used here to refer to an existence of a feature, an element, a step or a component, without excluding existences or attachments of one or more other features, elements, steps or components.

Although the present utility model and its advantages have been described in detail, it should be understood that various changes, substitutions and alterations can be made herein without departing from the spirit and scope of the utility model as defined by the appended claims. Moreover, the scope of the present application is not intended to be limited to the particular embodiments of the process, apparatus, means, methods and steps described in the Description. As one of ordinarily skill in the art will readily appreciate from the disclosure contained in the utility model, processes, apparatus, means, methods or steps presently existing or later to be developed, that perform substantially the same function or achieve substantially the same result as the corresponding embodiments described herein may be utilized according to the present utility model. Accordingly, the appended claims are intended to include within their scope such processes, apparatus, means, methods, or steps.

APPENDIXES

Appendix 1

A method for processing a scanned image, comprising:
a shaded region extracting step of extracting a region, which is shaded by a shading object and lies in a margin in the vicinity of an edge of the scanned image, as a shaded region; and a pixel value repairing step of repairing values of pixels, which lie both in a line segment and the shaded region, by using a linear model according to known values of pixels, which lie both in the line segment and the margin, the line segment passing through the shaded region and being parallel to the edge.

Appendix 2

The method according to appendix 1, further comprising:
estimating noises of pixels, which lie both in a line segment and the shaded region, according to known values of pixels, which lie both in the line segment and the margin, the line segment passing through the shaded region and being parallel to the edge; and
adding the estimated noises to the values of the pixels which lie both in the line segment and the shaded region.

Appendix 3

The method according to appendix 1, wherein the shaded region extracting step comprises:
providing a point in the shaded region;
estimating a central value of pixels in a small window around the point;
calculating a difference between the central value and a value of each of pixels in a big window around the point; and
extracting the shaded region according to the difference by using binarization.

Appendix 4

The method according to appendix 3, wherein prior to the shaded region extracting step, the method further comprises:
extracting the shaded region automatically;
not performing the shaded region extracting step in case of a successful automatic extraction; and
performing the shaded region extracting step in case of an unsuccessful automatic extraction.

Appendix 5

The method according to appendix 4, wherein after the shaded region extracting step, the method further comprises:
judging whether the shaded region extraction is successful; and
providing a user interface to enable manual extraction of the shaded region in case of an unsuccessful extraction.

Appendix 6

The method according to any one of appendixes 1 to 5, wherein the shading object is a finger.

Appendix 7

The method according to any one of appendixes 1 to 5, wherein the pixel values comprise color values.

Appendix 8

The method according to any one of appendixes 1 to 5, wherein the scanned image have a plurality of edges which are overlapped and parallel to each other.

Appendix 9

An apparatus for processing a scanned image, comprising:
a shaded region extracting module configured to extract a region, which is shaded by a shading object and lies in a margin in the vicinity of an edge of the scanned image, as a shaded region; and
a pixel value repairing module configured to repair values of pixels, which lie both in a line segment and the shaded region, by using a linear model according to values of pixels, which lie both in the line segment and the margin, the line segment passing through the shaded region and being parallel to the edge.

Appendix 10

The apparatus according to appendix 9, further comprising:
a noise estimating module configured to estimate noises of pixels, which lie both in a line segment and the shaded region, according to known values of pixels, which lie both in the line segment and the margin, the line segment passing through the shaded region and being parallel to the edge; and
a noise adding module configured to add the estimated noises to the values of the pixels which lie both in the line segment and the shaded region.

Appendix 11

The apparatus according to appendix 9, wherein the shaded region extracting module comprises:
a point providing sub-module configured to provide a point in the shaded region;
a central pixel value estimating sub-module configured to estimate a central value of pixels in a small window around the point;
a difference calculating sub-module configured to calculate a difference between the central value and a value of each of pixels in a big window around the point; and
an extracting sub-module configured to extract the shaded region according to the difference by using binarization.

Appendix 12

The apparatus according to appendix 10, further comprising:
an automatic extracting module configured to extract the shaded region automatically;
wherein if the automatic extracting module extracts the shaded region successfully, the shaded region extracting module does not perform the shaded region extraction, and if the automatic extracting module extracts the shaded region unsuccessfully, the shaded region extracting module performs the shaded region extraction.

Appendix 13

The apparatus according to appendix 12, further comprising:
a judging module configured to judge whether the shaded region extracting module extracts the shaded region successfully; and
a user interface configured to enable manual extraction of the shaded region if the automatic extracting module extracts the shaded region unsuccessfully.

Appendix 14

The apparatus according to any one of appendixes 9 to 13, wherein the shading object is a finger.

Appendix 15

The apparatus according to any one of appendixes 9 to 13, wherein the pixel values comprise color values.

Appendix 16

The apparatus according to any one of appendixes 9 to 13, wherein the scanned image have a plurality of edges which are overlapped and parallel to each other.

What is claimed is:

1. A method for processing a scanned image, comprising:
a shaded region extracting step of extracting a region, which is shaded by a shading object and lies in a margin in vicinity of an edge of the scanned image, as a shaded region;
a pixel value repairing step of repairing values of pixels, which lie both in a line segment and the shaded region, by using a linear model according to known values of pixels, which lie both in the line segment and the margin, the line segment passing through the shaded region and being parallel to the edge;
estimating noises of pixels, which lie both in the line segment and the shaded region, according to values of known noises of pixels, which lie both in the line segment and the margin, the line segment passing through the shaded region and being parallel to the edge; and
adding the estimated noises to the repaired values of the pixels which lie both in the line segment and the shaded region.

2. The method according to claim 1, wherein the shaded region extracting step comprises:
providing a point in the shaded region;
estimating a central value of pixels in a small window around the point;
calculating a difference between the central value and a value of each of pixels in a big window around the point; and
extracting the shaded region according to the difference by using binarization.

3. The method according to claim 2, wherein before the shaded region extracting step, the method further comprises:
an automatic shaded region extracting step of extracting the shaded region automatically;
not performing the shaded region extracting step in case of a successful automatic extraction; and
performing the shaded region extracting step in case of an unsuccessful automatic extraction.

4. The method according to claim 3, wherein after the shaded region extracting step, the method further comprises:
judging whether the shaded region extraction step is successful; and
providing a user interface to enable manual extraction of the shaded region manually in case of an unsuccessful automatic extraction.

5. An apparatus for processing a scanned image, comprising:
a shaded region extracting module configured to extract a region, which is shaded by a shading object and lies in a margin in vicinity of an edge of the scanned image, as a shaded region; and
a pixel value repairing module configured to repair values of pixels, which lie both in a line segment and the shaded region, by using a linear model according to values of pixels, which lie both in the line segment and the margin, the line segment passing through the shaded region and being parallel to the edge;
a noise estimating module configured to estimate noises of pixels, which lie both in the line segment and the shaded region, according to values of known noises of pixels, which lie both in the line segment and the margin, the line segment passing through the shaded region and being parallel to the edge; and
a noise adding module configured to add the estimated noises to the repaired values of the pixels which lie both in the line segment and the shaded region.

6. The apparatus according to claim 5, wherein the shaded region extracting module comprises:
a point providing sub-module configured to provide a point in the shaded region;
a central pixel value estimating sub-module configured to estimate a central value of pixels in a small window around the point;
a difference calculating sub-module configured to calculate a difference between the central value and a value of each of pixels in a big window around the point; and
an extracting sub-module configured to extract the shaded region according to the difference by using binarization.

7. The apparatus according to claim 6, further comprising:
an automatic extracting module configured to extract the shaded region automatically;
wherein if the automatic extracting module extracts the shaded region successfully, the shaded region extracting module does not perform the shaded region extraction, and if the automatic extracting module extracts the shaded region unsuccessfully, the shaded region extracting module performs the shaded region extraction.

8. The apparatus according to claim 7, further comprising:
a judging module configured to judge whether the shaded region extracting module extracts the shaded region successfully; and
a user interface configured to enable manual extraction of the shaded region if the automatic extracting module extracts the shaded region unsuccessfully.

* * * * *